Sept. 14, 1954   L. HEIDMANN ET AL   2,689,324
FREQUENCY CONVERTER GROUP
Filed Oct. 17, 1951   4 Sheets-Sheet 1
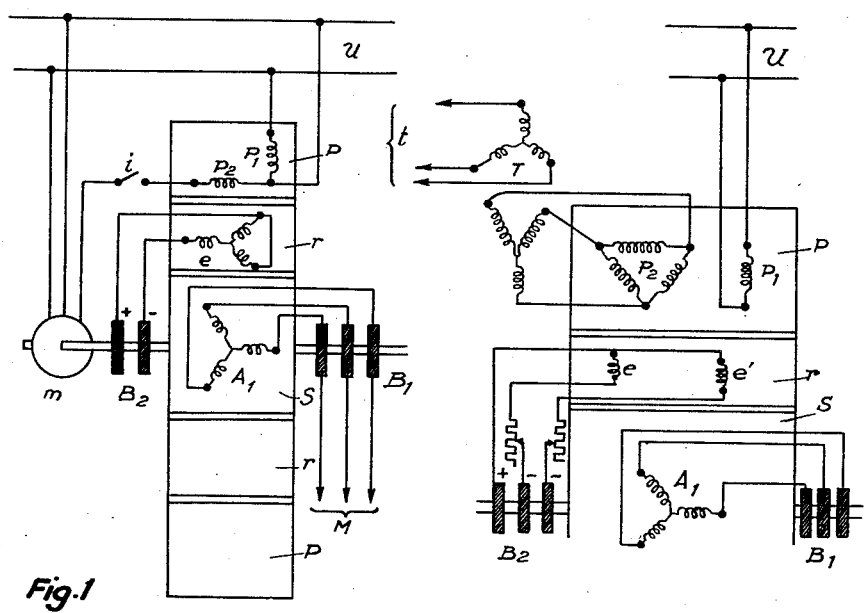
Fig.1
Fig.2
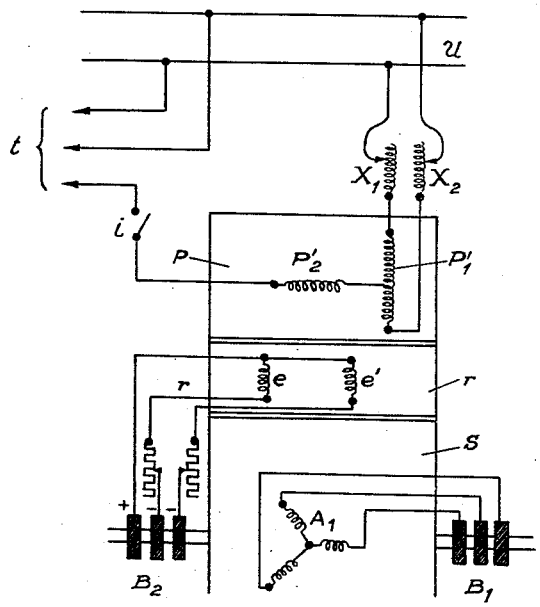
Fig.3
INVENTORS
Leon Heidmann
Louis Galzin
Pierre Letrilliart
By Shoemaker & Mattare
ATTORNEY Sept. 14, 1954  L. HEIDMANN ET AL  2,689,324
FREQUENCY CONVERTER GROUP
Filed Oct. 17, 1951  4 Sheets-Sheet 2

INVENTORS
Leon Heidmann
Louis Galzin
Pierre Letrilliart
By Shoemaker & Mattau
ATTORNEY.

Sept. 14, 1954 L. HEIDMANN ET AL 2,689,324
FREQUENCY CONVERTER GROUP
Filed Oct. 17, 1951 4 Sheets-Sheet 3

INVENTORS
Leon Heidmann
Louis Galzin
Pierre Letrilliart
By Shoemaker & Mattare
ATTORNEYS Sept. 14, 1954  L. HEIDMANN ET AL  2,689,324
FREQUENCY CONVERTER GROUP
Filed Oct. 17, 1951  4 Sheets-Sheet 4

INVENTORS
Leon Heidmann
Louis Golzin
Pierre Letrilliart
By Shoemaker & Mattew
ATTORNEYS Patented Sept. 14, 1954

2,689,324

UNITED STATES PATENT OFFICE 2,689,324

FREQUENCY CONVERTER GROUP

Leon Heidmann, Paris, and Louis Galzin and Pierre Letrilliart, Jeumont, France, assignors to Forges & Ateliers de Constructions Electriques de Jeumont, Paris, France, a French body corporate Application October 17, 1951, Serial No. 251,768

Claims priority, application France October 20, 1950

13 Claims. (Cl. 321—7)

This invention relates to frequency convertor groups for converting single-phase current to polyphase or vice versa, and for changing the frequency as desired; such groups, as described in the pending application Serial No. 81,518, filed March 15, 1949, now Patent 2,585,392, comprise a motor-driven convertor having a stator, a main rotor and an auxiliary or intermediate rotor revolving freely in the magnetic gap of the main rotor, this intermediate rotor revolving in synchronism with one of the oppositely rotating fields into which it is possible to resolve the alternating field produced by the single-phase current energizing the stator windings.

The present invention has for its main object to provide an improved frequency convertor group of this character having stator windings designed to transform single-phase line current into symmetrical polyphase current, operating in the convertor stator.

Another object of the invention is to improve the design and construction of the auxiliary or intermediate rotor.

A further object is to arrange the intermediate rotor in such a way as to obtain additional means for regulation of the convertor.

Other objects and advantages of the present invention will hereinafter appear from the following description of suitable embodiments, given with reference to the accompanying drawings, in which:

Fig. 1 is a diagram illustrating the frequency convertor group described in the aforesaid Patent 2,585,392, the driving motor of the group being indicated conventionally.

Fig. 2 illustrates an improved stator winding for the convertor, and Fig. 3 shows a modification thereof.

Figure 4:
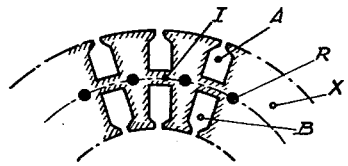
Fig. 4 represents part of the intermediate rotor, without its windings.

Referring to Fig. 1, which illustrates the convertor group described in the aforesaid Patent 2,585,392, the convertor comrises a stator P, a main rotor S and an auxiliary or intermediate rotor $r$. The stator P carries two windings $P_1$ and $P_2$, of which the first is connected to a single-phase supply line U; the other winding $P_2$ is connected by way of a switch $i$ to a driving motor $m$. The main rotor S carries a polyphase winding $A_1$ which is connected to the output rings $B_1$; the intermediate synchronous rotor $r$ is provided with a number of windings $e$ connected by means of slip rings $B_2$ to a source of direct current for exciting these rotor windings.

The main rotor S is driven by the motor $m$ at a speed which is variable during the operation of the convertor; rotation of the intermediate rotor $r$ in synchronism with one of the oppositely rotating fields due to the stator windings has the result of creating, in the well-known manner, one complete rotating field and damping the inverse rotating field. According to the speed of the driving motor $m$ and the direction of rotation of the main rotor S in relation to the intermediate rotor $r$, there can be obtained at the output rings $B_1$ a polyphase voltage of adjustable frequency, which is fed to an external circuit M, consisting for example of traction motors of the squirrel-cage type.

According to the present invention, as hereinafter described with reference to Figs. 2 and 3, the stator windings are so arranged as to transform the single-phase current of the line U into symmetrical polyphase current acting in the stator P of the convertor.

The balanced transfer of energy in the convertor is regulated in both senses by a combination of means according to which two inductively coupled stator windings are associated with control means for ensuring the symmetry of the polyphase voltages fed to the driving motor under load, while the intermediate rotor carries two filled windings housed in two distinct series of peripheral notches, which are separated by magnetic isthmuses; each of these windings is associated with an independent rheostat, whereby the magnetic flux in the isthmuses can be modified so that the convertor operates either as a motor, or partly as a motor and partly as an alternator.

As shown in Fig. 2, the windings of the stator P are arranged as a transformer with two separate windings; one winding $P_1$ is single-phase and connected to the single-phase supply line U, while the other winding $P_2$ is polyphase. The two windings can be placed in the same notches upon the stator, but preferably they are disposed in superposed notches separated by magnetic isthmuses, as in the well-known double-cage induction motors. When the winding $P_2$ comprises three delta-connected phase-windings, as in Fig. 2, they can be connected to an intermediate transformer T; the outgoing connections $t$ of this transformer can be used for energizing the stator of the driving motor $m$ of Fig. 1 to produce in this motor a rotating field.

In Fig. 3, the stator P has its inductively coupled windings connected as an auto-transformer; two windings $P_1'$ and $P_2'$ may be arranged as in the well-known Scott connection, the first of these windings being connected to the single-phase line U. In order to compensate the asymmetrical effects of the load, the common point may be slightly displaced in relation to the exact middle of the winding $P_1'$, or the theoretically necessary number of coils may be slightly modified. Such an adjustment serves only for transfer of energy in one sense.

Another compensation means consists in inserting two adjustable reactances $X_1$ and $X_2$ at the ends of the winding $P_1'$ which is connected to the single-phase supply. This will produce, under load, an adjustable displacement of the three voltages by a suitable rotation or angular shift of the voltage vectors.

The symmetrical and regular rotating field which is obtained with Figs. 2 and 3 is due to the action of the synchronous intermediate rotor $r$, which carries the windings $e$ and $e'$; the structure of this rotor will now be described.

According to Fig. 4, this rotor can be formed by a ring X composed of magnetic laminations or stampings which comprise two series of notches A and B, separated by magnetic isthmuses I of suitable width. The punching of the notches A and B may be effected to various patterns, according to the desired arrangement of the windings; in Fig. 4, for example, the punching is of uniform pattern around the circumferences, and each of the two series of notches A and B can carry a normal three-phase winding. The rivets R which fix the bundle of stampings or laminations are placed, as shown in the drawing, between the isthmuses I, engaging with end-clamping rings or plates (not shown) at the same position.

Figure 5:
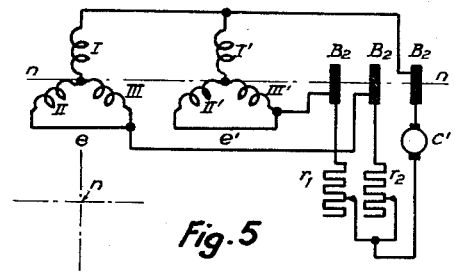
Figs. 5, 7 and 11 are diagrams showing the connections of the intermediate rotor windings.

As shown in Fig. 5, the two windings, one $e$ being placed in the notches A and the other $e'$ in the notches B, revolve about an axis $n$—$n$, and can be connected in parallel to three slip rings $B_2$ (instead of the two rings in Fig. 1); they are energized by a direct-current source $C^1$ through adjustable rheostats $r_1$ and $r_2$. These rheostats allow the currents in each of the windings $e$ and $e'$ to be adjusted separately. The phase II and III of the outer winding $e$ are connected in parallel, as also are the phases II' and III' of the inner winding $e'$, so as to provide damping.

Adjustment of the resistances $r_1$ and $r_2$ will modify the exciting currents in each of the field windings of the rotor $r$ and the flux passing in the isthmuses I. This enables the operation of the machine to be modified progressively as follows:

When the resultant flux which passes in the isthmuses I shown in Fig. 4 is nil, the machine will operate as a motor, and the intermediate rotor serves to damp the inverse field and to produce the resultant flux by internal excitation. On the contrary, if the isthmuses are made to pass, first the resultant flux of the stator P and the outer winding $e$, and secondly the resultant flux of the main rotor S and the inner winding $e'$, the machine will operate both as a motor and as an independent alternator.

The stator P and the outer field winding $e$ form in the latter case a synchronous motor, while the main rotor S and the inner field winding $e'$ form an alternator of which the effective speed is equal to the difference or the sum of the speeds of the two rotors, according to the direction of rotation of the main rotor S in relation to the intermediate rotor $r$.

Figure 6:
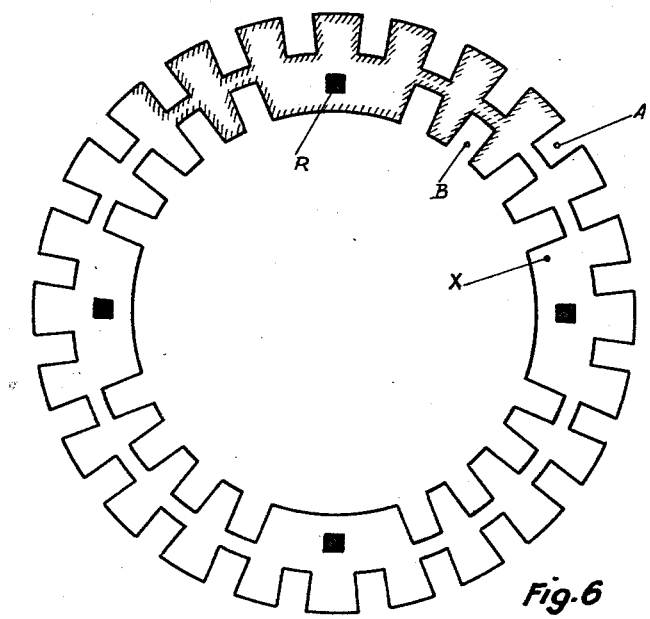
Figs. 6, 10 and 12 show modifications of the intermediate rotor, without windings.

Fig. 6 shows a lamination or stamping X having a complete series of outer notches A, while the inner notches of the series B are provided only over part of the circumference, for example over two-thirds of the circumference, being grouped according to the number of poles of the machine. The assembly rivets or bolts R can in this case be placed in the unpunched portions of the laminations.

Figure 7:
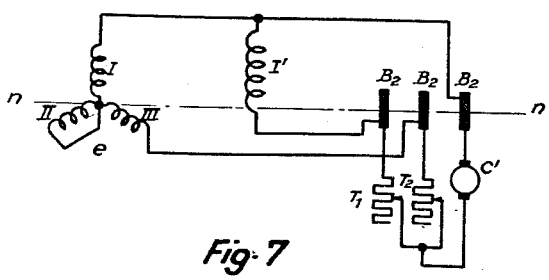

This arrangement is particularly advantageous when the notches of the series A contain a normal three-phase winding $e$ with its phases I, II and III, as represented on the left in Fig. 7, while its inner notches B carry a distributed single-phase winding I'. One or two phases, for example the phase II, can be connected in parallel, as in Fig. 5, in order to form a first damper the axis of which is suitably orientated in relation to the single-phase winding I'. A damping effect can likewise be produced by short-circuiting the phase II, as shown in Fig. 7.

Figure 8:
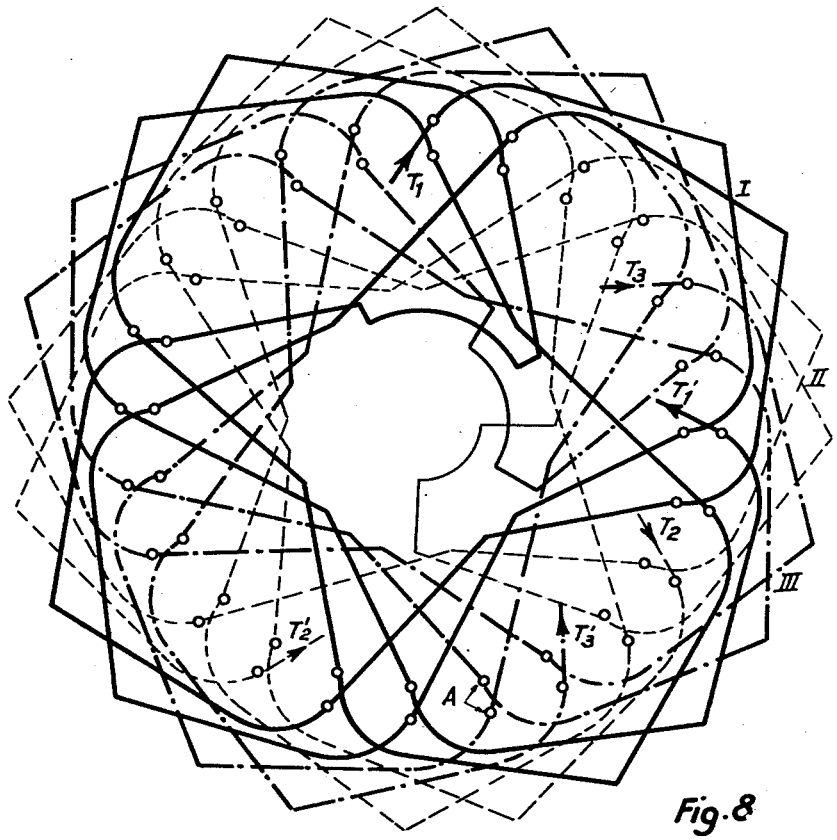
Figs. 8 and 9 illustrate examples of suitable intermediate rotor windings.

Fig. 8 represents an example of a complete three-phase winding for the rotor of Fig. 7. In this diagram, the phase I is shown in thick lines, phase II in thin dotted lines, and phase III in thick chain lines. It has been assumed that each notch of the series A of Fig. 6 contains two conductors, as indicated by the small circles aligned radially in adjacent pairs in Fig. 8. The arrows $T_1$ and $T_1'$ indicate the respective ends of phase I, the arrows $T_2$ and $T_2'$ the ends of phase II and the arrows $T_3$ and $T_3'$ those of phase III. The phase windings can be connected together at one end, as shown in Fig. 7, for example at $T_1$, $T_2$ and $T_3$, to form the neutral point, their other ends $T_1'$, $T_2'$ and $T_3'$ being connected to three slip rings $B_2$.

Figure 9:
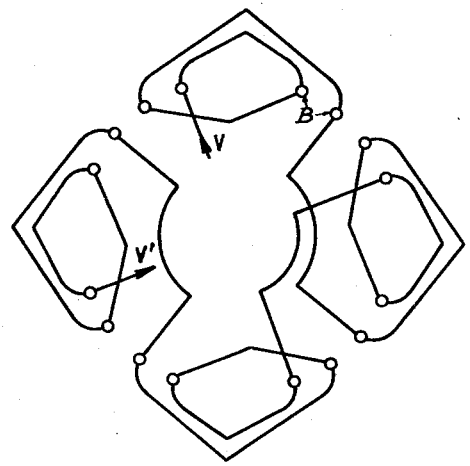

The arrangement of the single-phase winding I' in Fig. 7 is represented by way of example in Fig. 9. It is located in the notches B which occupy only part of the circumference of the intermediate rotor $r$. The respective ends of this winding are marked as V and V'.

Figure 10:
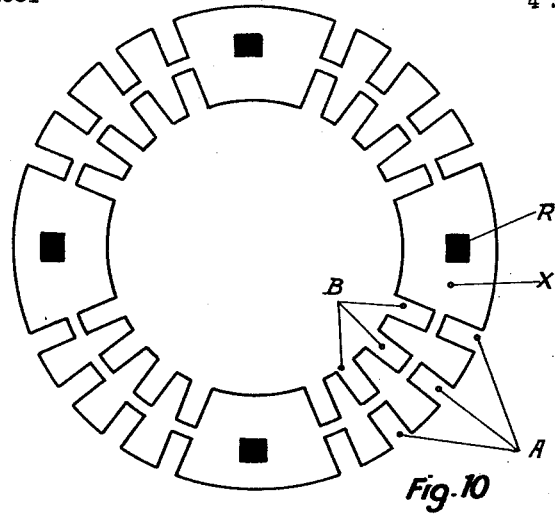

In the case of Fig. 10, the notches of the series A, as well as those of the series B, occupy part of the circumference of the ring X. They carry single-phase windings I and I' respectively connected to the rings $B_2$ as shown in Fig. 11.

Figure 11:
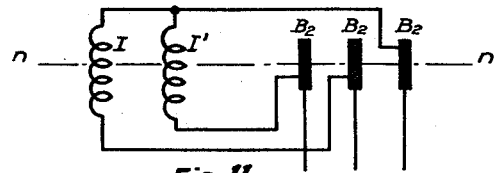
Figure 12:
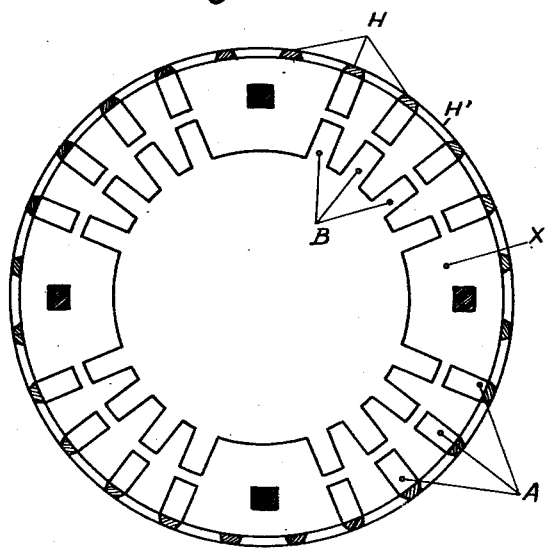

According to Fig. 12, the intermediate rotor, which may be connected for example as shown in Fig. 11, comprises a supplementary damper system formed by a cage H made of bars or cables, the ends of which are connected together by short-circuiting rings H'.

In certain cases, when it is possible or even advisable for the purpose contemplated, to provide a certain fixed and non-adjustable magnetic flux between the two field windings of the intermediate rotor, there can be used a particularly simple arrangement comprising only the outer cage H—H' and a single winding disposed in the inner notches B, this single winding being fed by two brushes $B_2$.

Adjustment of the exciting currents of the intermediate rotors described, can be effected by any suitable control apparatus. In the case where the output or load circuit M of Fig. 1 consists of electric traction motors, for example, this adjustment can be effected automatically according to the torque, power factor, starting conditions, and other circumstances.

What we claim is:

1. In a variable frequency convertor group of the type having a stator, a main rotor, an intermediate freely revolving rotor and a driving motor, the combination of means for symmetrical control of its operation under load, comprising two inductively coupled windings, of which the first is connected to a single-phase supply system and the other to said driving motor, and a driving connection between said driving motor and said main rotor, said intermediate rotor having an outer periphery and an inner periphery, two corresponding and distinct series of notches on said outer and inner peripheries respectively with magnetic isthmuses separating said series of notches, a direct current field winding in each of said series of notches, and two field rheostats, each of said rheostats being connected in series with one of said field windings.

2. A variable frequency convertor group, formed by a rotary convertor including a polyphase-wound stator, a main polyphase-wound rotor the windings of which are connected to a variable-frequency load-circuit, and an intermediate freely-revolving rotor, and by a variable-speed driving motor mechanically connected to said main rotor, in combination with means for balanced adjustment of the operation of said group, comprising two inductively coupled stator windings, the first of said stator windings connected to a single-phase supply circuit, the second of said windings being interconnected with the stator phases of said motor to form a polyphase interconnection between the two machines, a series of notches upon the outer circumference and another series of notches upon the inner circumference of said intermediate rotor, with magnetic isthmuses between the respective notches of both said series, a direct current field winding in each of said series of notches, a common terminal for said field windings, a field rheostat associated with each of said field windings, three slip rings for separate energizing of said field windings, one of said slip rings being connected directly to said common terminal of both said field windings, and each of the other slip rings respectively to a remaining terminal of one field winding through one of said field rheostats.

3. A variable frequency convertor group, formed by a variable-speed driving motor and a rotary convertor including a polyphase-wound stator, a main polyphase-wound rotor connected to a variable-frequency load-circuit, and an intermediate freely-revolving rotor, and a driving connection between said motor and said main rotor, in combination with means for balanced adjustment of the operation of said group, comprising two inductively coupled stator windings, the first of said stator windings connected to a single-phase supply circuit, the second of said windings being polyphase, an interconnection of all phases of said second winding with corresponding phases of said motor, a series of notches upon the outer circumference and another series of notches upon the inner circumference of said intermediate rotor, with magnetic isthmuses between the respective notches of both said series, a direct current field winding in each of said series of notches, a field rheostat associated with each of said field windings, and three slip rings connected for exciting separately each of said field winding in series with one of said field rheostats.

4. A variable frequency convertor group, formed by an adjustable polyphase driving motor and a rotary convertor including a polyphase-wound stator, a main polyphase-wound rotor connected to a variable-frequency load-circuit and an intermediate freely-revolving rotor, and a driving connection between said motor and said main rotor, in combination with means for balanced adjustment of the operation of said group, comprising two inductively coupled stator windings, one of said stator windings connected to a single-phase supply circuit, the other of said windings being polyphase and having each phase terminal interconnected with a corresponding phase terminal of said motor, means for switching said phase interconnections, a series of notches upon the outer circumference and another series of notches upon the inner circumference of said intermediate rotor, with magnetic isthmuses between the respective notches of both said series, a direct current field winding in each of said series of notches, a field rheostat associated with each of said field windings, three slip rings connected to energize separately each of said field windings in series with one of said rheostats.

5. A variable frequency convertor group, formed by a variable-speed polyphase driving motor and a rotary convertor including a polyphase-wound stator, a main polyphase-wound rotor connected to a variable-frequency load-circuit, and an intermediate freely-revolving rotor, and a driving connection between said motor and said main rotor, in combination with means for balanced adjustment of the operation of said group, comprising two inductively coupled stator windings, the first of said stator windings connected to a single-phase supply circuit, the second of said windings having a plurality of phases the terminals of which are interconnected with the respective phase terminals of said motor said intermediate rotor including two field windings located on the inner and outer circumferences of said intermediate rotor in two distinct series of peripheral notches separated by magnetic isthmuses, an independent rheostat associated with each of said field windings for adjustment of the magnetic flux in said isthmuses, said adjustment determining selective operation of said converter as a motor or partly as a motor and partly as an alternator.

6. A variable frequency convertor group, formed by a variable-speed polyphase driving motor and a rotary convertor including a polyphase-wound stator, a main polyphase-wound rotor connected to a variable-frequency load-circuit, and an intermediate freely-revolving rotor, and a driving connection between said motor and said main rotor, in combination with means for balanced adjustment of the operation of said group, comprising two startor windings coupled inductively with one another, the first of said stator windings being monophase and connected to a single-phase supply line, the second of said stator windings being polyphase, means for interconnecting said polyphase stator winding with the stator of said driving motor, separate field windings on respective circumferences of said intermediate rotor, and slip rings on said main rotor for feeding separately adjustable direct currents to said field windings.

7. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, separate field windings on respective circumferences of said intermediate rotor, and a driving connection between said motor and said main rotor, in combination with means for balanced adjustment of the operation of said group, comprising two stator windings coupled inductively with one another, the first of said stator windings being single-phase and connected to a single-phase supply line, the second of said stator windings being polyphase, an intermediate polyphase transformer, means for connecting said polyphase stator winding to said transformer, and means for connecting the output terminals of said transformer to said driving motor whereby polyphase power is exchanged between said converter and said motor.

8. A variable frequency convertor group, formed by a variable-speed polyphase motor and a rotary convertor including a polyphase-wound stator, a main polyphase-wound rotor with slip rings connected to a variable-frequency load-circuit, and an intermediate freely-revolving rotor with separate field windings located on the respective circumferences of said intermediate rotor, and a driving connection between said motor and said main rotor, in combination with means for balanced adjustment of the operation of said group, comprising two stator windings inductively coupled on the Scott connection, one of said stator windings being connected to a single-phase supply line, and interconnections for exchanging polyphase current between said Scott connection and the driving motor, the number of coils of the different portions of said Scott connection departing from their theoretical values in order to compensate for the disequilibrium of the polyphase voltages under load, and means for exciting said intermediate rotor by direct current.

9. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, with separate field windings located on the respective circumferences of said intermediate rotor, and a driving connection between said motor and said main rotor, in combination with means for balanced adjustment of the operation of said group, comprising two stator windings inductively coupled on the Scott connection, one of said stator windings being connected to a single-phase supply line, adjustable reactances included in the connections between said stator and said single-phase line, interconnections for exchanging polyphase current between said Scott connection and the driving motor, and means for exciting said intermediate rotor by direct current.

10. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, and a driving connection between said motor and said main rotor, in combination with means for balanced adjustment of the operation of said group, comprising two inductively coupled stator windings, the first of said stator windings connected to a single-phase supply circuit, the second of said windings being polyphase and interconnected with the respective phases of said driving motor for enabling the exchange of polyphase power between the machines of the group, said intermediate rotor including two field windings located in two distinct series of peripheral notches separated by magnetic isthmuses, each series of notches of said intermediate rotor extending around the entire circumference, said field windings being three-phase wound, one phase of each field winding being parallel with one phase of the other field winding and the two remaining phases of each field winding being interconnected in parallel to form two damping circuits.

11. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, and a driving connection between said motor and said main rotor, in combination with means for balanced adjustment of the operation of said group, comprising two inductively coupled stator windings, one of said stator windings connected to a single-phase supply circuit, the other of said windings being polyphase and interconnected with the respective phases of said driving motor for enabling the exchange of polyphase currents between both machines of the group, said intermediate rotor including two field windings located in two distinct series of peripheral notches separated by magnetic isthmuses, one of said series of peripheral notches being external of said intermediate rotor, extending around its entire circumference and the winding therein being a normal polyphase winding, and the other of said series of peripheral notches being internal of said intermediate rotor, extending only partly around its circumference, and the winding therein being a single-phase winding.

12. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, and a driving connection between said motor and said main rotor, in combination with means for balanced adjustment of the operation of said group, comprising two inductively coupled stator windings, one of said stator windings connected to a single-phase supply circuit, the other of said windings being polyphase and connected to the respective phases of said driving motor for an exchange of polyphase power between the convertor and the motor, said intermediate rotor including two field windings located in two distinct series of peripheral notches separated by magnetic isthmuses, said series of peripheral notches each extending only partly around the circumference of said intermediate rotor, the windings in each of said series being single-phase, and two independently adjustable rheostats connected between the respective windings and the source of direct current.

13. A variable frequency convertor group, formed by a variable-speed polyphase driving motor and a rotary convertor including a polyphase-wound stator, a main polyphase-wound rotor with slip rings connected to a variable-frequency load-circuit, and an intermediate freely-revolving rotor, and a driving connection between said motor and said main rotor, comprising two inductively coupled stator windings, one of said stator windings connected to a single-phase supply circuit, the other of said stator windings having a plurality of phases which are connected to the respective phases of said driving motor to form a polyphase interconnection between both machines of the group, at least one externally energized direct current field winding upon said intermediate rotor, and a supplementary damper formed by a squirrel-cake winding upon said intermediate rotor.

References Cited in the file of this patent

UNITED STATES PATENTS

| Number | Name | Date |
|---|---|---|
| 730,673 | Lunt | June 9, 1903 |
| 1,480,712 | Fortescue | Jan. 15, 1924 |
| 1,808,435 | Punga | June 2, 1931 |
| 2,420,266 | Schwartz | May 6, 1947 |
| 2,557,901 | Wiseman | June 19, 1951 |

FOREIGN PATENTS

| Number | Country | Date |
|---|---|---|
| 941,043 | France | Dec. 30, 1948 |